June 25, 1957 C. WASMANSDORFF 2,797,313

RADIO COMMUNICATION BY NEUTRAL FREQUENCY DEVIATION

Filed March 27, 1951 3 Sheets-Sheet 1

Inventor:
Carlton Wasmansdorff,

By Homer R. Montague

ATTORNEY

RADIO COMMUNICATION BY NEUTRAL FREQUENCY DEVIATION

Filed March 27, 1951 3 Sheets-Sheet 2

Inventor:
Carlton Wasmansdorff,
By Homer R. Montague
ATTORNEY

June 25, 1957 C. WASMANSDORFF 2,797,313

RADIO COMMUNICATION BY NEUTRAL FREQUENCY DEVIATION

Filed March 27, 1951 3 Sheets-Sheet 3

Inventor:
Carlton Wasmansdorff,
By Homer R. Montague
ATTORNEY

United States Patent Office 2,797,313

Patented June 25, 1957

2,797,313

RADIO COMMUNICATION BY NEUTRAL FREQUENCY DEVIATION

Carlton Wasmansdorff, Los Angeles, Calif., assignor to Hoffman Electronics Corporation, Los Angeles, Calif., a corporation of California Application March 27, 1951, Serial No. 217,781

12 Claims. (Cl. 250—8)

Figure 1:
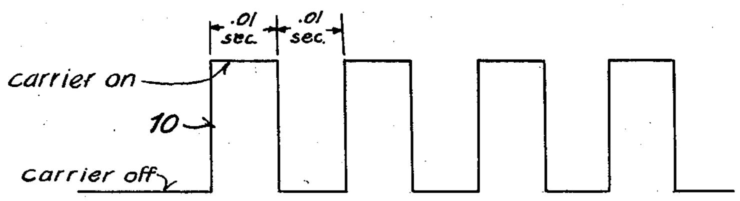

This invention pertains to radio wave transmission, and particularly to an improved system for the transmission of keyed intelligence characterized by its relative freedom from the deleterious effects of noise interference, selective fading and multipath phenomena.

The problem of obtaining maximum effective utilization of radio wave bandwidth, in terms of the amount of intelligence conveyed per unit of time, and the related problem of obtaining maximum accuracy and reliability of transmission between given points, have received considerable attention from workers in this art. Various schemes and systems of different degrees of utility have been suggested to achieve the desired ends, and some of these systems have gone into wide commercial use. In order that the improvements provided by the present invention may be understood and appreciated, the principal basic systems of radio wave intelligence transmission will be described briefly.

*Make-break*

Historically speaking, the original system of radio telegraph transmission was the make-break or on-off system, under which a carrier wave of constant frequency was amplitude-modulated in a discontinuous manner corresponding to the dots and dashes of the Morse or other code. In other words, carrier power was radiated from the transmitting antenna in pulses corresponding to the dots and dashes theretofore used in land-line telegraphy. At a later date, and in order to simplify the equipment required for machine telegraphy (and to obtain other advantages) code systems were introduced in which the characters are represented by different combinations of pulses all of the same length. The transmission system, however remained essentially on-off.

This on-off system radiates power only during the "mark" portion of each character element or dot. The carrier is transmitted for the full duration of the mark period, but the significant intelligence conveyed during this period is defined only at the beginning and end of the mark; no further intelligence is conveyed during the time when the transmitter is in the steady-mark state or the steady-space state which intervenes between the beginning and end of transitions from the mark to space or the on to off conditions. Such transmission is subject to errors by reason of the existence of such transmission anomalies as fading, atmospheric noise, and various forms of intentional or inadvertent interference.

On long circuits, multipath propagation produces two distinct phenomena. First, periodic cancellation can occur due to the arrival of signals of equal amplitude and opposite phase over separate paths. Second, the arrival of delayed signal or echo over a secondary path after the end of mark condition over the main path produces the effect of a "drag-out" or increase of character length, so that the speed of transmission (say in dots per minute) must be reduced to enable the dots to be distinguished at the receiver.

Continued observation of make-break signals over long paths shows that even though severe fading may occur during the mark, or for the entire period of the mark, the beginning and end of the mark will usually be discernible on visual monitoring equipment such as an oscilloscope. It is therefore possible to receive a usable indication of the time of the beginning and end of the mark and yet receive the character incorrectly due to a break (such as a heavy fade) during the steady-state portion of the character when in fact the radiated power is not being used to carry any further intelligence. However, if the receiving system did not require a holding function to be performed by the received signal during the steady-state period of the mark, power wasted during this period could be used to raise the carrier power radiated during the intelligence-conveying phases at the beginning and end of each mark period. In this connection, it should be noted that the signal is more susceptible to selective fading during periods when the carrier is in a steady-state condition.

Since the detection of the make-break signal is accomplished on an amplitude basis, anything which effectively down-modulates the signal during the steady-state condition tends to cause incorrect intelligence to appear at the receiver; conversely, during periods when the carrier is not transmitted, that is, during break periods, a noise burst or interfering signal may appear as incorrect information, particularly where machine printing or recording is employed at the receiver and the aural differences noted by a trained operator cannot be utilized.

The basic on-off system as described above has been modified by numerous improvements, but many of the limitations of this type of transmission remain.

*Frequency shift*

A basically different type of transmission which has gone into wide commercial use is the so-called frequency shift system, in which carrier power is radiated continuously, nominally at constant amplitude, but with the carrier frequency being shifted periodically between two different values corresponding to the marks and spaces of the desired intelligence. Perhaps the greatest single advantage of this system lies in the fact that because power is radiated during the space period as well as during the mark, the signal voltage at the receiver can be used to hold the keyer "off" in the space position and "on" in the mark position; however this fact also leads to undesirable complications under multipath conditions. As conventionally employed, the carrier is in a steady amplitude state all of the time and a steady frequency state the majority of the time, the frequency being deviated only at the beginning and the end of each mark period. As has been shown, such a signal is very susceptible to radio frequency cancellation due to multipath phenomena, and on long paths considerable cancellation occurs during both mark and space periods.

Moreover, the frequency shift technique as commonly employed has the great disadvantage that immediately prior to the transmission of the mark frequency, space frequency has been radiated. If any of this space frequency arrives over a delay path, it produces a cancelling voltage (D. C.) in the discriminator and output filter of the receiver. Since it is a direct current cancellation which occurs, equal amplitudes and opposite phases are not required to produce cancellation in the load resistors and output filter of the discriminator.

The fact that this frequency shift system transmits space frequency just prior to mark frequency, and mark frequency just prior to space frequency, produces the result that delayed arrival of either frequency causes D. C. cancellation of the other. Thus, the effect of a given time delay on a circuit has been doubled. Further, in the event of delay at the beginning of the mark, a combination of space and mark frequencies appears at the discriminator; at the end of the mark, a combination of mark and space frequencies appears. Obviously these combinations are identical to one another, and the discriminator therefore has no clue to which condition is correct. This has been completely verified by actual operation, and when pronounced producing the result that despite excellent signal strength, signals could not satisfactorily be received.

*Neutral frequency shift*

The present invention is directed to the provisions of a system which will eliminate the defects above noted with respect to conventional transmission systems, and in general it accomplishes this by what may be considered a neutral frequency shift operation, comprising the deviation of carrier frequency in one direction to signify the beginning of a mark period, such deviation lasting for a time which is short compared to the duration of the mark condition. The carrier is immediately restored to the frequency it had just prior to the momentary deviation, and it remains at this "neutral" frequency until the end of the mark period, at which time it is again deviated in frequency in the opposite sense for a short time to signify the end of the mark period. The carrier frequency is then returned immediately to its neutral frequency, and is maintained at that frequency until the beginning of the next mark period. In order to give an idea of the relative values which may be employed, the invention will hereafter be described in connection with a carrier which is deviated 425 cycles per second on either side of the neutral radio carrier frequency, and in which the duration of each deviation from neutral is of the order of $\frac{1}{10}$ or less of the time occupied by each mark period. As will be seen, such a system substantially eliminates difficulty due to multipath propagation, and since the significant intelligence is conveyed during a relatively small percentage of the total time for the transmission of a message, it enables the available power to be concentrated during the very short intervals at the beginning and end of each mark and space period, and thereby to increase the available useful signal power at the receiver.

Figure 2:
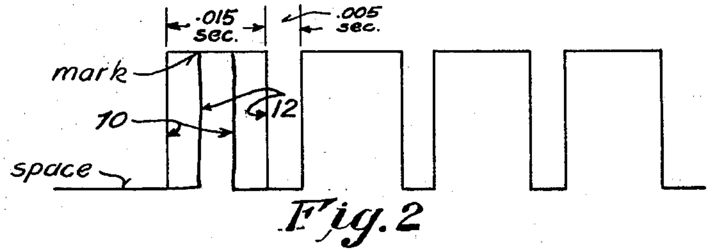
Figure 3:
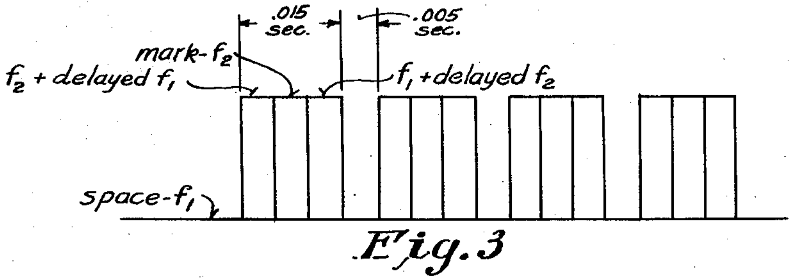
Figure 4:
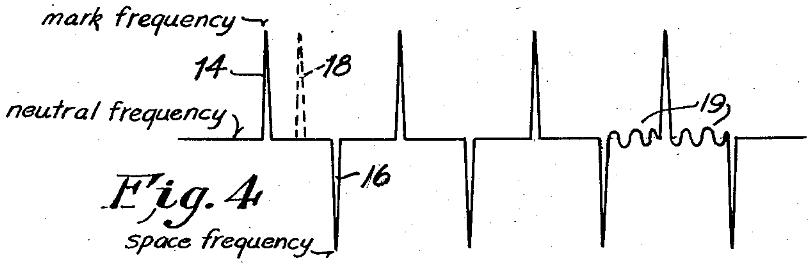
Figure 5:
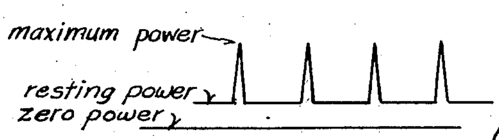
Figure 6:
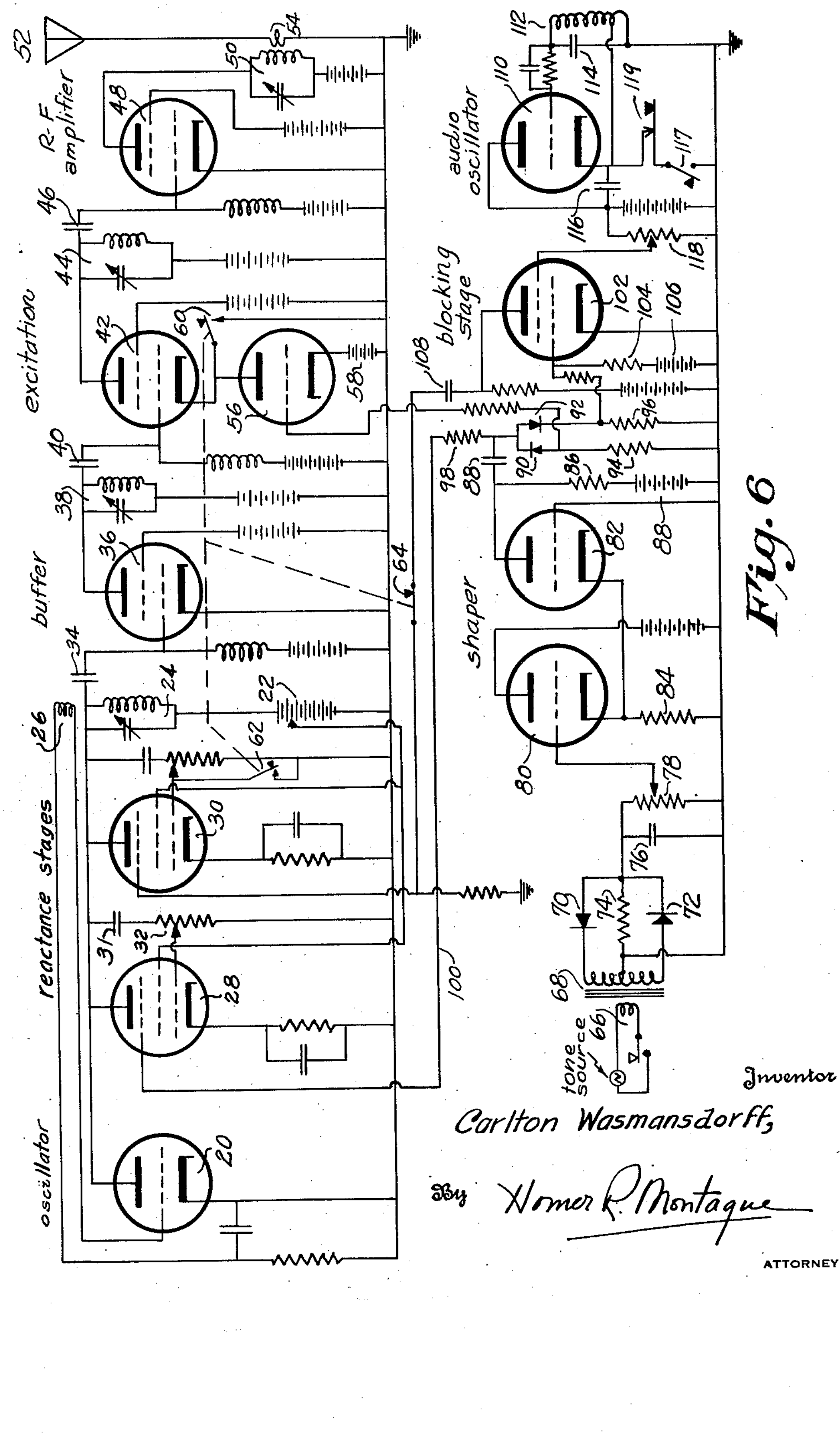
Figure 7:
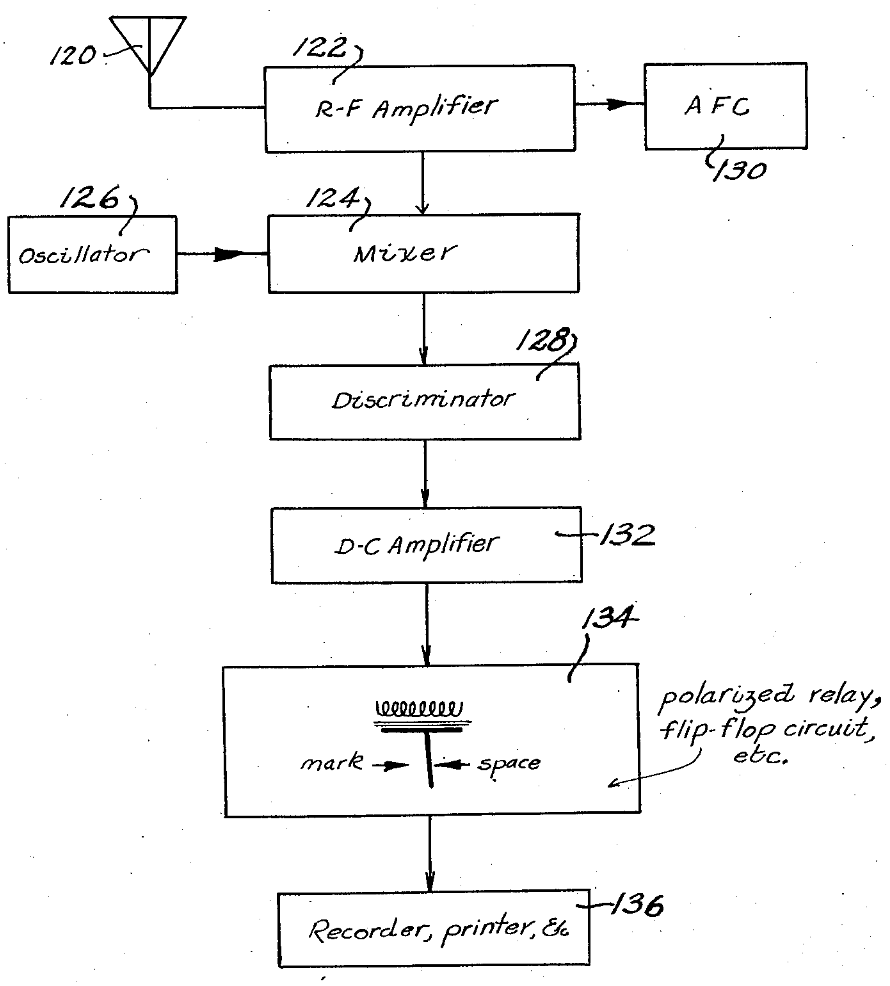

The invention itself, and the preferred manner of practicing the same, will be described in detail hereinbelow, reference being made to the accompany drawings, in which:

Fig. 1 is a graphical representation of an idealized signal of the conventional on-off carrier type, Fig. 2 is a similar representation of the same signal as received under multiple path conditions, Fig. 3 is a graphical representation of a conventional frequency shift signal as received under multiple path conditions, Fig. 4 is a similar showing of the momentary deviation of a carrier to either side of a neutral frequency in accordance with the present invention, Fig. 5 is a graphical representation illustrating the way in which radiated carrier power may be increased during the frequency deviations shown in Fig. 4, Fig. 6 is a schematic diagram of one exemplary embodiment of a carrier wave transmitter providing the type of signal utilized in my invention, and Fig. 7 is a schematic and block diagram of a receiving equipment suitable for use in the improved system of the invention.

Referring now to Fig. 1 of the drawings, the international signal for the character "H" is illustrated in terms of the radiation of a fixed frequency carrier in four spaced dots, represented by the four square pulses 10 in the figure. This illustration shows the dots as having a duration of .01 second, with an interval between successive dots of the same amount, it being understood that the wave shape chosen is idealized and does not show the distortion resulting from the rise and decay times of the carrier level, key clicks and like transients. Under ideal conditions of reception, the received wave form would approximate that of Fig. 1, but if the signal corresponding to Fig. 1 is received over two paths one of which corresponds to a greater distance, the direct and reflected pulses will overlap at the receiver, to which it will appear that the dots are lengthened at the expense of the spaces between dots, as will be seen in Fig. 2 in which the pulse 10 corresponding to the first dot has superimposed thereon (as received) a reflected or delayed pulse 12 arriving (say) .005 second after said direct pulse. The reduction in clear space or break time at the receiver constitutes a limitation on the speed with which the circuit can reliably be keyed, and under conditions in which the delay time is equal to or greater than the interval between dots of the ideal signal, complete loss of received intelligence results.

Fig. 3 of the drawings illustrates graphically the result of multipath propagation on a conventional frequency shift system. In this figure, the ordinates represent the excursion of frequency of the carrier between the space frequency $f_1$ and the mark frequency $f_2$, while the abscissas again represent time to the same scale as in Figs. 1 and 2. Here again, multipath conditions produce an overlapping of the two conditions corresponding to mark and space, with the difference that since the carrier had the frequency $f_1$ just prior to being shifted to $f_2$ at the transmitter, the first dot of the letter "H" (or equivalent baud of any character) commences (at the receiver) with a mixture of the mark frequency $f_2$ received over the direct path with the space frequency $f_1$ which continues to arrive over the delay path. Assuming again a secondary path delay of .005 second, the frequency distribution in each baud at the receiver will appear as in Fig. 3. Since the discriminator output at the receiver adds the D. C. levels produced by the mark and space frequencies in an algebraic manner, this mixing of mark and space frequencies is capable of producing cancellation of discriminator output regardless of the phase relationships of the direct and delayed carrier frequencies. The effect produced on the accuracy of communication is very deleterious, and some of the results have been adverted to above.

In Fig. 4 of the drawings, there is shown graphically the neutral frequency shift system of the present invention, in which again frequency deviations are shown as ordinates, the time scale being as before. Under this system, the carrier is maintained at a neutral frequency during the great majority of the transmission, and is deviated momentarily, as illustrated by pulse 14, in the direction of increasing carrier frequency at the beginning only of the first baud of the character, immediately returning to the neutral frequency at which it remains until the end of the first baud. Thereupon, the carrier is momentarily deviated in the opposite sense (for example toward a lower frequency) for the time indicated by pulse 16, also immediately returning to the neutral frequency until the next baud is to be transmitted. It will be seen from this figure that carrier energy is not required in order to hold the receiver (and recording or printing mechanism controlled thereby) in either the mark or space condition. This holding function is accomplished locally at the receiver, and it does not depend for its reliability of operation upon the transmission of carrier energy.

The tremendous advantages of this system under multipath conditions can now be realized by considering again a transmission delay of .005 second in a secondary propagation path. The delayed pulse corresponding to pulse 14 would then be represented by the pulse 18, and since this delayed pulse at mark frequency will arrive at a time when the keyed device at the receiver is already in the mark position, where it will remain until shifted by the arrival of a pulse of space frequency, the delayed pulse 18 will have no effect whatever upon the operation of the receiver or its printer or other output device. As will be noted hereinafter, maximum utilization of the advantages of this system involves the use of a discriminator whose D. C. output is zero at the neutral frequency, and cancellation at the D. C. level cannot occur. Note that in this system, if delayed signals are present, the discriminator receives both neutral and mark voltages at the beginning of the mark, and neutral and space voltages at the end of the mark. The discriminator now has positive data for discrimination since the combinations are different.

It is now apparent that the new system provides, for a given degree, of discrimination at the receiver, the possibility of utilizing only half of the instantaneous frequency excursion required by the conventional frequency shift technique; while the total excursion from mark to space in the example chosen may be of the same value as the frequency shift in the usual system, say 850 cycles per second, the excursion of each pulse such as pulses 14 and 16 need be only 425 cycles during the same transition interval. Thus, the maximum side band frequency developed by the shift transient will be lower than in the conventional system. At the same time, the side bands lying on the desired intelligence side of the discriminator characteristic produce the effect of frequency diversity at the time the intelligence is transmitted, and the chance of error due to an instantaneous fade is reduced.

Inasmuch as the system of the present invention does not involve the transmitting of useful intelligence during the interval between frequency deviations, it is perfectly feasible to reduce the carrier energy in between these significant deviations. This type of operation is illustratd by Fig. 5, in which the carrier level is shown as being raised to its maximum value during the interval of each frequency deviation pulse, returning to some relatively lower value denoted "resting power" for a major portion of the transmission time. For a given continuous rating for the transmitter, it is then possible to achieve much higher energy levels of transmission than is the case in conventional systems of frequency shift in which the carrier is continuously radiated at the maximum rating of the equipment. This power modulation, as it may be called, enables a very substantial increase in the available signal-to-noise ratio at the receiver. The resting power, where it is desired to maintain continuous carrier (for example for automatic frequency or volume control at the receiver) should preferably be of sufficient magnitude to provide these functions, but since they are essentially continuous in nature and not particularly responsive to random noise and like interference, the resting power may still be so chosen as to permit a much higher level of energy radiation during periods in which intelligence is being conveyed by the pulse of frequency deviation.

I have described my system so far in terms of a neutral frequency which is shifted momentarily and continuously to displaced values, the instantaneous frequency passing through all intermediate values, which is preferred because of the fact that it effectively provides a form of frequency diversity. However, the basic advantage of the system can also be achieved by shifting the carrier substantially instantaneously from the neutral frequency to the mark frequency and return; this may be achieved for example by keying two oscillators supplying the same output stages at the transmitter, and designing the circuits and the antenna so as to minimize ringing therein.

In order to provide the additional advantages of frequency-diversity for the more reliable operation of automatic frequency control, automatic volume or carrier-level control, tuning indicators or like circuits at the receiver, the unshifted neutral-frequency carrier transmitted between the pulses of deviated frequency may itself be subjected to a degree of audio-frequency modulation. Thus, during intervals between pulses such as 14 and 16 of Fig. 4, and before and after them, the undeviated carrier may be caused to undergo a continuous periodic change of frequency preferably of a fractionally smaller magnitude than that corresponding to the keyed pulses, and having a periodicity several times that of the frequency of the keying pulses themselves. A portion of such a "wobbled" carrier is designated by reference 19 in Fig. 4. Since the magnitude, in terms of frequency, of this wobbling is substantially lower than the keyed carrier deviation, this can be accomplished without generating sideband frequencies lying outside the total keyed deviation band, and hence with no increase in total bandwidth of the channel.

A schematic illustration of one exemplary embodiment of a complete transmitter employing the principles described above is shown in Fig. 6 of the drawings. In that figure, numeral 20 designates an oscillator stage energized by a source of anode potential 22, the frequency of its output being established at the desired neutral frequency by the tank circuit 24. Feedback for the production of oscillations is provided by the inductance 26 coupled to the inductance of the tank circuit and providing excitation for the grid of the oscillator stage 20. Usual grid bias circuits are shown for all stages of the transmitter, as will be understood, without further description, by those skilled in this art. Also, for example, completely separate D. C. anode (and for some stages, grid) power supplies are illustrated, and it is to be understood that some or all of these may be replaced by common D. C. sources without departing from the scope of my invention.

For purposes of illustration I have shown the oscillator 20 as provided with frequency deviating means comprising a reactance tube 28 arranged to supply the necessary quadrature current to tank circuit 24 via the phase shifting network of capacitor 31 and resistor 32. This reactance tube operates to deviate the neutral frequency in accordance with the intelligence to be transmitted, under the control of circuits to be described. The control of oscillator frequency by such a reactance tube utilizing the Miller effect is well known in the art, and need not be further described for the purposes of explaining my invention. A second reactance stage 30, operating identically with the stage 28, is also provided for controlling the neutral frequency deviation applied to the carrier for frequency diversity purposes as described above.

Proceeding with the description of Fig. 6, the carrier frequency output in tank circuit 24 is applied through coupling capacitor 34 to the control grid of an isolation or buffer amplifier 36, whose output is tuned by tank circuit 38 to the neutral frequency. From this stage, carrier frequency energy is coupled over capacitor 40 to the control grid of an excitation control tube 42 also having a tank circuit (44) tuned to the neutral frequency and providing excitation via coupling capacitor 46 to the control grid of the carrier output amplifier 48. The output of this final stage of the transmitter is coupled from its tank circuit 50 to the antenna 52 by inductance 54.

As described above, it is excitation control tube 42 which controls the R. F. power output of the final amplifier 48. In order to permit this tube automatically to raise the carrier energy transmitted during the keyed pulses corresponding to the frequency deviations conveying intelligence, the control tube 56 is arranged with its anode-cathode path in series with the cathode return path of excitation control tube 42. This tube 56 is preferably normally biased by battery or the like 58 so that a small amount of space current flows through tube 42 at all times, corresponding to the "resting" power level of the final amplifier 48. At the beginning and end of each baud of intelligence, the grid of tube 56 is made positive with respect to its cathode for a short period, causing tube 42 to provide heavy excitation to the output stage 48 to increase the power output for the duration of each keyed deviation from neutral frequency and return.

In order to enable the transmitter to be used as a conventional amplitude modulated transmitter, the final or output stage 48, or a preceding stage, may be controlled by any conventional modulating means; for example, to provide a conventional radio telephone channel. When so operated, ganged switches 60 and 62 may be closed to ground the cathode of excitation control 42 thus eliminating the effect of control tube 56, and to ground the control grid of reactance stage 30 to remove the constant neutral frequency deviation. At the same time, ganged switch 64 would be opened, to prevent the effect on reactance tube 30 of neutral frequency deviations from the control circuits to be described.

The manner in which the R. F. portions of the transmitter are controlled from a conventional signal source of intelligence will now be described. This input intelligence may conventionally be in the form of a keyed tone of audio-frequency, which is applied to the primary winding 66 of transformer 68 whose tapped secondary winding is connected to unilaterally conducting rectifier elements 70 and 72 in a bridge circuit producing a keyed unidirectional output across resistor 74. A filter condenser 76 removes the higher audio-frequency components, developing across resistor 78 a voltage corresponding to the envelope of the keying wave. This envelope potential is squared and limited by clipper tubes 80 and 82, the output of tube 80 being developed across cathode resistor 84 and applied direct to the cathode of tube 82. The output of tube 82, developed across its load resistance 86 and anode supply 88, is a squared keying wave having an average D. C. value above ground potential. This squared voltage wave is applied across a composite circuit comprising a coupling condenser 88 and reversely connected rectifying elements 90 and 92, each having a series resistance 94 and 96 respectively. This composite circuit produces three separate and distinct control voltages:

(1) A differentiated voltage comprising pulses representing the keyed input, said pulses being positive at the beginning of each baud and negative at the end of each, and at zero voltage for the larger part of the duration of each baud; these pulses are fed through resistor 98 and conductor 100 to the suppressor grid of reactance tube 28, thus serving to deviate the neutral frequency produced in tank circuit 24 in the manner illustrated in Fig. 4.

(2) A second differentiated but unidirectional voltage wave, developed across resistor 96 and applied to the control grid of a blocking stage 102; these pulses occur at the same time as the pulses applied to reactance tube 28, but all have negative polarity with reference to ground. The normal grid bias of blocking tube 102, produced by resistor 104 and bias supply 106, is such that its plate current is cut off whenever the signal frequency is being deviated by tube 28. In the absence of such negative pulses on the grid of tube 102, the latter serves to supply, via capacitor 108, a modulating potential to the suppressor grid of reactance tube 30, and thus to provide the relatively continuous low order frequency deviation in the keyer. This deviation has a frequency several times that corresponding to the highest signal keying speed, and is produced for example by a conventional Hartley oscillator comprising tube 110 and audio-frequency inductance 112 and condenser 114. Audio frequency voltage produced thereby passes through blocking condenser 116 and the resistor 118 to the second grid of tube 102. This deviation wave applied to tube 30 is suppressed during signal deviations of the carrier by reason of the negative pulse applied to tube 102 by resistor 96 as above described.

(3) The third voltage developed is applied to the grid of tube 56, and constitutes positive pulses coinciding with the intervals of keyed frequency deviations which permit increased current to flow momentarily in tube 56 and thereby drive the cathode of control tube 42 in a negative direction to increase the power output of the final stage to its design maximum value.

From the above description, it will be seen that when switches 60 and 62 are closed, and switch 64 opened, the control signal applied to transformer winding 66 would produce the frequency deviation pulses 14, 16 of Fig. 4, but the continuous shifting of the carrier indicated at 19 in Fig. 4 would be suppressed. Thus, final amplifier 48 or a preceding stage could be amplitude modulated, for example to provide a telephone channel. On the other hand, audio oscillator 110 might also be keyed to provide a telegraph channel constituted by the interruption of continuous frequency deviation voltage 19 provided by the oscillator 110. Thus, with the switches 60, 62 and 64 in the positions shown in Fig. 6, and with switch 117 closed to short the lower or plate portion of the inductance of tank circuit 112, oscillator 110 will be inoperative, and it can be keyed into periodic oscillations by operation of telegraph key 119, in accordance with any desired telegraphic keying pattern.

In discussing the exemplary embodiment described in detail above for purposes of illustration, it has been shown that the conversion of what may be termed square-wave bauds into the equivalent pulses of carrier frequency deviation from a neutral frequency permits the instantaneous power at which the significant intelligence is radiated to be vastly increased, where a single channel of transmission is utilized. Obviously, however, the time interval between the pulses of frequency deviation corresponding to the beginning and the end of each baud or dot may be utilized for the addition of other channels of intelligence. As a particular example, where the length of the basic element or baud, and the interval between possible baud positions, are predictable, as in modern machine code systems, this idle time of the channel can be used to carry a separate channel of intelligence or a plurality of separate channels on a time-division basis. Also, since the pulses are very short and occupy (for a single channel of telegraph communication) only a small percentage of the total time, a full-strength neutral frequency carrier may also be used to carry telephonic modulation in the form of amplitude modulation of such carrier.

Insofar as concerns telegraphic communication alone, the system is not necessarily restricted to deviating a neutral frequency carrier in opposite frequency senses for the beginning and end of each baud; the pulses corresponding to the beginning and end of the baud may be coded multiple pulses of frequency shift in the same or different senses, such modifications being well within the scope of the present invention in its broadest sense.

Frequency-deviated emissions of the type with which the invention is concerned can be received and converted into usable intelligence by a wide variety of types of receivers. For convenience, and by way of illustration, I have shown in Fig. 7 a block diagram of a receiver of a type capable of converting the upward and downward keyed frequency deviations back into successive dots or bauds of the same length and spacing as those illustrated in Fig. 1; that is, into a square wave lying wholly on one side of a zero axis, and which may represent unipolar D. C. signals capable of operating conventional machine-printing equipment. In Fig. 7, reference numeral 120 designates the receiving antenna which supplies the incoming carrier to a conventional radio frequency amplifier 122 which, in the usual manner of superheterodyne receivers, furnishes the amplified signal to a mixer stage 124 where it is combined with local oscillations produced by oscillator 126, subjected to amplification at the intermediate frequency by conventional means (not shown) and applied to the discriminator 128. Where automatic frequency or automatic carrier-level control is provided, as mentioned above, corresponding control equipment may be fed directly from the R. F. amplifier as indicated at 130. Discriminator 128 acts to convert the momentary deviations from the carrier neutral frequency into corresponding direct current pulses which are amplified as at 132 and applied to a keyer 134.

This keyer 134 may comprise a polarized relay whose armature is swung between two contacts corresponding to "mark" and "space" respectively, in accordance with the polarity of the pulses derived from the amplifier 132, and these two output contacts may be utilized for controlling the relatively large amounts of D. C. power required for the operation of conventional printers, recorders or the like broadly designated by numeral 126. It is not to be understood that the system in any way depends on the particular design of the keyer 134 or the other components of the receiver; for example, keyer 134 may consist of a conventional one-shot multivibrator, flip-flop circuit or other device having the characteristic of providing an output condition initiated by the received pulse corresponding to the beginning of a baud, and a second output condition established by the pulse corresponding to the end of a baud. Also, as has already been mentioned, suitable printers and recorders can be designed to operate directly from the successive pulses, rather than requiring the auxiliary converting keyer 134, which latter is illustrated merely to show one way in which the received signals may be applied to conventional printers.

The system of the present invention has been described herein in connection with a preferred and exemplary embodiment, but it is to be understood that the details of construction and arrangement shown are intended as exemplary only, and the invention is not to be understood as limited by such details except as may be required by the scope of the appended claims.

I claim:

1. In a radio wave transmission system, means for generating and transmitting a carrier having a predetermined neutral frequency, and means for momentarily altering the frequency of said carrier away from said neutral frequency and back to said neutral frequency, successively in opposite directions of frequency value, each pair of successive deviations corresponding to a baud of intelligence to be transmitted.

2. In a radio wave transmission system, means for generating and transmitting a carrier having a predetermined neutral frequency, and means for momentarily altering the frequency of said carrier away from said neutral frequency and back to said neutral frequency, successively in opposite directions of frequency value, each pair of successive deviations corresponding to a baud of intelligence to be transmitted, the time-durations of said frequency alterations being short compared to the time interval between successive alterations.

3. In a radio wave transmission system, means for generating and transmitting a carrier having a predetermined neutral frequency, means for momentarily altering the frequency of said carrier away from said neutral frequency and back to said neutral frequency, successively in opposite directions of frequency value, each pair of successive deviations correcponding to a baud of intelligence to be transmitted, and means for continuously shifting the frequency of said generating means during the intervals between successive momentary alterations, the rate of such shifting being at least several times the recurrence frequency of the opposite momentary alterations.

4. In a radio wave transmission system, means for generating and transmitting a carrier having a predetermined neutral frequency, means for momentarily altering the frequency of said carrier away from said neutral frequency and back to said neutral frequency, successively in opposite directions of frequency value, each pair of successive deviations corresponding to a baud of intelligence to be transmitted, and means for amplifying the amplitude of said carrier to a degree controlled by said altering means.

5. In a radio wave transmission system, means for generating and transmitting a carrier wave of predetermined nominal frequency, means for deviating the frequency of said carrier wave away from said nominal frequency and back to said nominal frequency successively in opposite directions of frequency movement and for intervals of time which are small fractions of the intervals between successive deviations, and means for shifting the frequency of said carrier in a continuous manner to either side of said neutral frequency during the intervals between successive deviations of said carrier frequency.

6. The invention in accordance with claim 5, and means for disabling said frequency-shift means during the intervals occupied by said frequency deviations.

7. In a radio wave transmission system, means for generating and transmitting a carrier wave of predetermined nominal frequency, means for altering the frequency of said carrier wave away from said nominal frequency and back again successively in opposite directions of frequency movement and for intervals of time which are small fractions of the intervals between successive deviations, means for shifting the frequency of said carrier in a continuous manner to either side of said neutral frequency during the intervals between successive deviations of said carrier frequency, and means for disabling the last-named means.

8. In a radio wave transmission system, means for generating and transmitting a carrier wave of predetermined nominal frequency, means for altering the frequency of said carrier wave away from said nominal frequency and back again successively in opposite directions of frequency movement and for intervals of time which are small fractions of the intervals between successive deviations, for conveying signal intelligence, means for shifting the frequency of said carrier in a continuous manner to either side of said neutral frequency during the intervals between successive deviations of said carrier frequency, and means for intermittently disabling the last-named means in accordance with other signal intelligence.

9. A radio wave transmitter comprising means for generating and transmitting oscillations of nominally constant neutral frequency, means for altering said frequency away from said neutral frequency and back again successively in opposite directions of frequency movement for spaced intervals which are short compared to the time between such intervals, means for amplifying the deviated carrier, and means responsive to the deviation of said carrier for controlling the degree of amplification thereof.

10. In a carrier wave transmitter, an oscillation generator, a pair of devices connected to said generator to alter the frequency thereof, a keyed input circuit, means connecting said input circuit to one of said devices for deviating the frequency of said carrier a controlled amount in successively opposite senses in accordance with the keying of said input circuit, an audio-frequency oscillator connected to the other of said devices for shifting the frequency of said generator in a continuous manner, and means responsive to the operation of said connecting means for disabling said audio-frequency oscillator during periods of energization of the first one of said devices.

11. Apparatus for the wave transmission of intelligence in the form of a carrier wave whose frequency normally rests at a predetermined value and alternately shifts to two different values for short periods to indicate the respective end points of a baud of intelligence whose time duration is measured by the time between alternate shifts, comprising means for generating a carrier wave having a frequency of said predetermined value, means for transmitting said carrier wave to an output circuit, a keying circuit, and means responsive to the condition of said keying circuit for momentarily altering the frequency of said carrier wave, for a predetermined short period of time, upon each change in the condition of said keying circuit; said last-named means being constructed and arranged to complete each frequency alteration in a time which is short compared to the time duration of any baud.

12. Apparatus in accordance with claim 11, in which said last-named means is constructed and arranged to alter momentarily the frequency of said carrier in opposite directions, with respect to frequency, upon successive changes in the condition of said keying circuit.

References Cited in the file of this patent

UNITED STATES PATENTS

| | | |
|---|---|---|
| 1,874,978 | Hansell | Aug. 30, 1932 |
| 2,185,192 | Hansell | Jan. 2, 1940 |
| 2,299,388 | Hansell | Oct. 20, 1942 |
| 2,401,807 | Wolff | June 11, 1946 |
| 2,422,664 | Feldman | June 24, 1947 |
| 2,424,971 | Davey | Aug. 5, 1947 |
| 2,427,363 | Matte | Sept. 16, 1947 |
| 2,456,992 | Pugsley | Dec. 21, 1948 |
| 2,548,814 | Peterson | Apr. 10, 1951 |